United States Patent [19]
Holeva

[11] Patent Number: 5,365,597
[45] Date of Patent: Nov. 15, 1994

[54] METHOD AND APPARATUS FOR PASSIVE AUTORANGING USING RELAXATION

[75] Inventor: Lee F. Holeva, New Millville, Conn.

[73] Assignee: United Parcel Services of America, Inc., Atlanta, Ga.

[21] Appl. No.: 75,738

[22] Filed: Jun. 11, 1993

[51] Int. Cl.⁵ .......................... G06K 9/00; G06K 9/36
[52] U.S. Cl. ............................................ 382/8; 382/41
[58] Field of Search ........................ 382/1, 8, 41, 43; 358/227; 354/400, 402; 250/201.2, 201.7

[56] References Cited

U.S. PATENT DOCUMENTS

| | | | |
|---|---|---|---|
| 4,184,968 | 1/1980 | Stauffer | 250/201 |
| 4,647,193 | 3/1987 | Rosenfeld | 356/4 |
| 4,965,444 | 10/1990 | Groud et al. | 382/1 |
| 4,965,840 | 10/1990 | Subbarao | 382/1 |
| 5,148,209 | 9/1992 | Subbarao | 354/400 |
| 5,193,124 | 3/1993 | Subbarao | 382/1 |
| 5,231,443 | 7/1993 | Subbarao | 354/460 |

OTHER PUBLICATIONS

Cardillo et al. "3D Position Sensing Using a Passive Monocular Vision System" IEEE PAMI Aug. 1991, 809–813.

Pentland "A New Sense for Depth of Field" IEEE PAMI Jul. 1987, 523–531.

*Primary Examiner*—Joseph Mancuso
*Assistant Examiner*—David Fox
*Attorney, Agent, or Firm*—Steve Mendelsohn; William H. Murray

[57] ABSTRACT

A method and apparatus for passive autoranging. Two cameras having different image parameters (e.g., focal gradients) generate two images of the same scene. A relaxation procedure is performed using the two images as inputs to generate a blur spread. The blur spread may then be used to calculate the range of at least one object in the scene. In one preferred embodiment, a temporal relaxation procedure is employed to focus a third camera. In another preferred embodiment, a spatial relaxation procedure is employed to determine the range of a plurality of objects.

89 Claims, 7 Drawing Sheets

METHOD AND APPARATUS FOR PASSIVE AUTORANGING USING RELAXATION

BACKGROUND OF THE INVENTION

1. Field of the Invention

The present invention relates to autoranging, and, in particular, to passive methods and apparatuses for determining the range of one or more objects and/or for focussing a camera.

2. Description of the Related Art

In the field of package shipping, it is desirable to have a camera positioned overhead a conveyor system to read package labels as packages are propelled along the conveyor system. Since package heights may vary greatly, the field of view of the camera may also vary greatly. It is therefore desirable to use a high-resolution camera (e.g., with a 4096-pixel linear array charge coupled device (CCD) sensor) to generate images of the package labels. The camera system preferably provides autofocussing of the high-resolution camera to adjust for the varying package heights.

One known technique for focussing an overhead camera employs a light curtain consisting of a one-dimensional vertical array of light-emitting diodes (LED) and a matching one-dimensional vertical array of photo-transistors. The LED array is positioned on one side of the conveyor to transmit radiation across the conveyor path toward the photo-transistor array positioned on the other side of the conveyor. Package height is indicated by the lowest non-interrupted light beam as the package passes between the LED and photo-transistor arrays. This height estimate is then used to focus the high-resolution overhead camera.

This technique of autoranging can only measure the highest point of a stack of packages. Moreover, the resolution is limited by the density of LED/photo-transistor pairs in the matched arrays.

This technique of autoranging also employs active autofocussing, wherein radiation is generated with the specific purpose of focussing. Active autofocussing contrasts with passive autofocussing in which only ambient radiation is required to perform the focussing function.

Another known technique for determining package height employs scanned-laser triangulation. In this technique, a laser spot is scanned across the package surface by means of either a gavanometer stepped mirror or by a rotating mirror polygon. The range of the package is inversely proportional to the displacement of the reflected spot as imaged by either a line-scan CCD array or by a lateral-effect photodiode (i.e., a position sensing device).

This technique takes considerable time to scan mechanically the laser spot and limits the applicability of this technique to slow moving conveyor systems. In addition, there is the risk of injury to people from the laser radiation.

Yet another known technique for determining package height employs projected-pattern triangulation. In this technique, either a single light strip or a pattern of light strips are projected onto a package surface. Displacements of the projected light pattern imaged by a two-dimensional CCD array are inversely proportional to the range of the package.

Under this technique, the projected light pattern may be difficult to see in the presence of intense ambient light used for the high-resolution camera. Moreover, it takes considerable time to acquire a two-dimensional image.

It is also desirable, in the field of package shipping, to determine the heights of stacks of nested packages. Robots are preferably used to place and remove packages from nested stacks for storage and/or shipping. To function efficiently and automatically, the robots preferably have information regarding the height of each package stack.

Subbarao (U.S. Pat. No. 4,965,840) discloses the use of a pair of cameras with differing parameters and characteristics to image a scene for the purposes of either object range determination or autofocussing. The system of Subbarao estimates blur spread, which may then be used to determine object range and/or generate autofocus parameters. However, the system of Subbarao employs an algorithm that requires knowledge of the camera parameters for the pair of cameras, such as the aperture size, the focal length, and the distance between the second principal plane and the image detector plane.

It is accordingly an object of the present invention to overcome the disadvantages and drawbacks of the prior art and to provide an improved passive system for range determination and/or camera focussing.

It is a further object of the present invention to provide a system for passive autoranging without requiring any knowledge of camera parameters such as aperture size, focal length, or the distance between the second principal plane and the image detector plane.

It is a further object of the present invention to focus a high-resolution camera positioned overhead a conveyor system in order to generate images to read labels on packages on the conveyor system.

It is a further object of the present invention to determine the heights of a plurality of stacks of nested packages.

It is a further object of the present invention to stabilize the blur-spread estimates to random variations of the data (i.e., the perceived images). Stabilized blur-spread estimates imply more consistent and more accurate range and focus setting calculations.

Further objects and advantages of this invention will become apparent from the detailed description of a preferred embodiment which follows.

SUMMARY OF THE INVENTION

The present invention is a method and apparatus for determining at least one blur spread corresponding to at least one object. According to a preferred embodiment, a first image of at least one object is provided, where the first image is generated by a camera having a first camera parameter. A second image of the object is also provided, where the second image is generated by a camera having a second camera parameter different from the first camera parameter. A relaxation procedure is performed in accordance with the first and second images to generate at least one blur spread.

According to an alternative preferred embodiment, a first image of at least one object is provided with a first camera having a first focal length, a first aperture size, a first distance between a second principal plane and an image detector plane of the first camera, and a first camera parameter. A second image of the object is also generated, where the second image is generated with a camera having a second camera parameter different from the first camera parameter. At least one blur spread is generated in accordance with the first and second images and independent of the first focal length, the first aperture size, and the first distance of the first camera.

An advantage of the present invention is that it provides autoranging passively, that is, using ambient radiation.

Another advantage of the present invention is that a preferred embodiment may be used to provide passive autofocussing of a camera.

Another advantage of the present invention is that an alternative preferred embodiment may be used to determine the profile of heights of nested packages in stacks.

Another advantage of the present invention is that preferred embodiments have no moving parts.

Another advantage of the present invention is that preferred embodiments provide precise autoranging over relatively large depths of view.

Another advantage of the present invention is that preferred embodiments provide autofocussing in a relatively short period of time and are therefore applicable to fast moving conveyor systems.

BRIEF DESCRIPTION OF THE DRAWINGS

Other objects, features, and advantages of the present invention will become more fully apparent from the following detailed description of the preferred embodiment, the appended claims, and the accompanying drawings in which:

DESCRIPTION OF THE PREFERRED EMBODIMENT(S)

Preferred embodiments of the present invention are directed to systems for determining the range of at least one object from a blur-spread estimate, where the blur-spread estimate is generated via a procedure such as a relaxation procedure that receives as input two images of the object generated by cameras having different image parameters such as focal gradients. Depending upon the application, systems according to the present invention may employ a temporal relaxation procedure to determine a single blur-spread estimate or a spatial relaxation procedure to determine multiple blur-spread estimates. Each blur-spread estimate may be used to determine the range of an object in the two images. Thus, when a spatial relaxation procedure is employed, the multiple blur-spread estimates may be used to determine the ranges of multiple objects in the two images.

In one preferred embodiment, a system according to the present invention employs a temporal relaxation procedure to focus a high-resolution camera positioned overhead packages on a conveyor system. Such a system is described in further detail later in this specification in conjunction with FIGS. 1-4. In another preferred embodiment, a system according to the present invention employs a spatial relaxation procedure to determine the heights of a plurality of stacks of nested packages. Such a system is described in further detail later in this specification in conjunction with FIGS. 5-7.

Focussing an Overhead Cameras Using Temporal Relaxation

Figure 1:
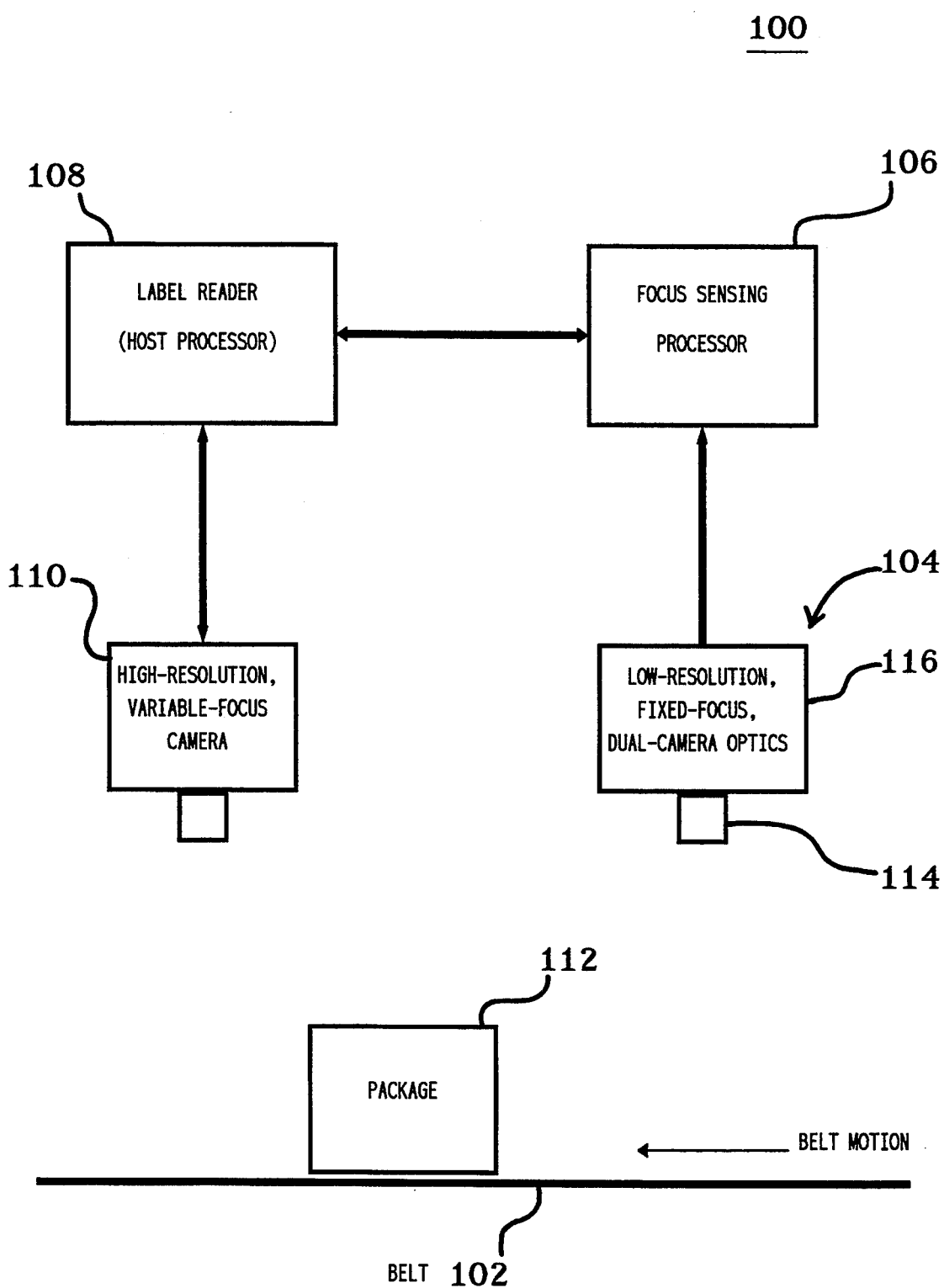
FIG. 1 is a block diagram of a system for passive autofocussing according to a preferred embodiment of the present invention.

Referring to FIG. 1, there is shown a block diagram of system 100 for passive autofocussing according to a preferred embodiment of the present invention. System 100 includes conveyor belt 102, low-resolution, fixed-focus, dual-camera optics 104, focus sensing processor 106, label reader 108, and high-resolution, variable-focus camera 110. Dual-camera optics 104 has optical system 114 and camera hardware 116. Optical system 114 and camera hardware 116 are described in further detail later in this specification in conjunction with FIGS. 2 and 3, respectively.

Package 112 is propelled along belt 102 passing first under dual-camera optics 104 and then under high-resolution camera 110. As package 112 passes under dual-camera optics 104, dual-camera optics 104 generates two images, each image perceived by cameras having different focal gradients, of the top of package 112. Both images are transmitted to focus sensing processor 106, which performs a temporal relaxation procedure based on the two images to generate a blur-spread estimate. Focus sensing processor 106 uses the blur-spread estimate to calculate the focus distance for high-resolution camera 110, which transmitted to label reader 108. Label reader 108 uses the focus distance to focus camera 110 in time to generate a high-resolution image of the top of package 112 as package 112 passes under camera 110.

Camera 110 may be a conventional high-resolution, variable-focus camera and is preferably a 4096-pixel CCD line-scan array to enable perception of details on package labels. Label reader 108 may be any conventional computing device and is preferably a special purpose computer for decoding package labels. Conveyor belt 102 may be any conventional conveyor system.

Figure 2:
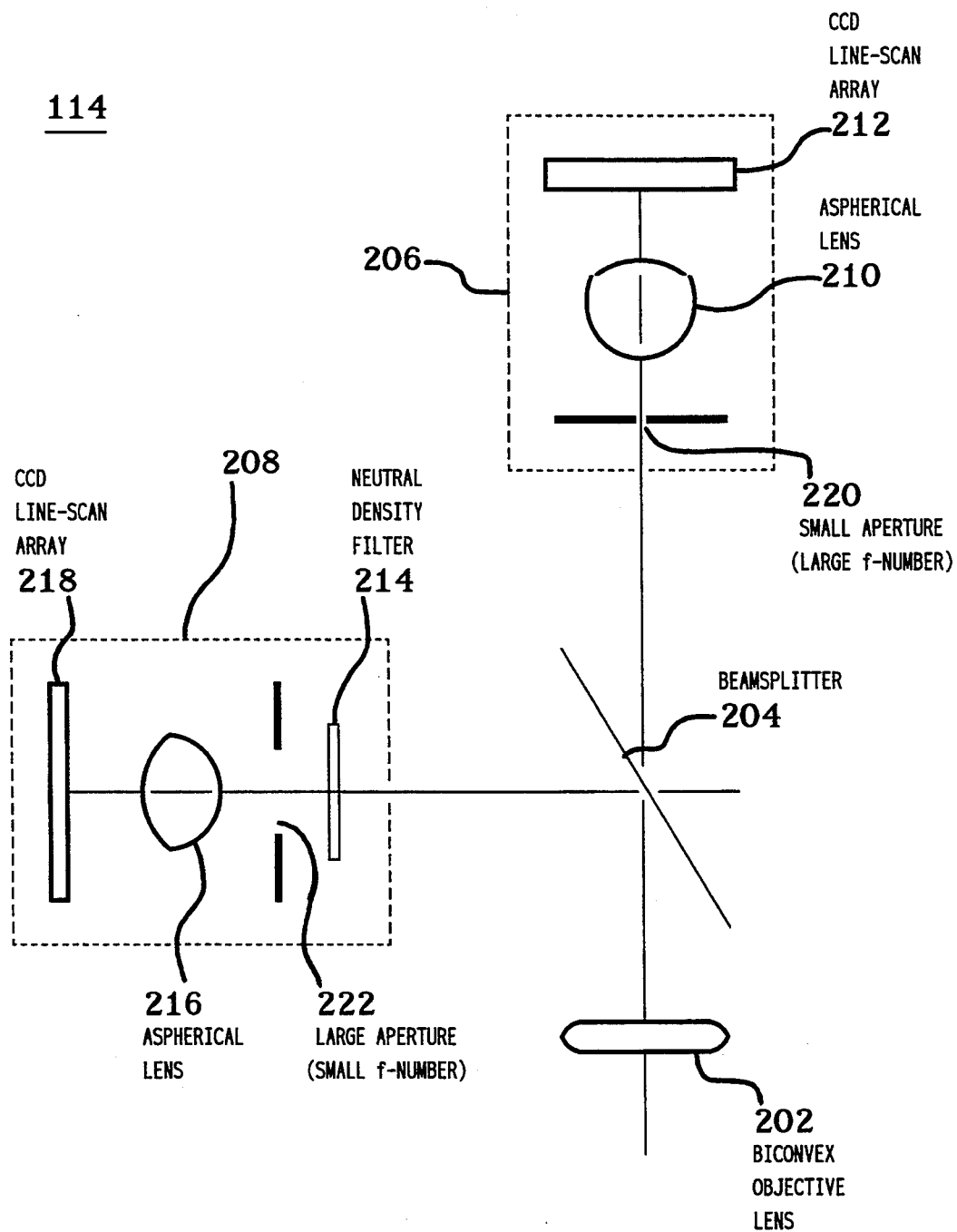
FIG. 2 is a schematic diagram of the optical system of the dual-camera optics of the system of FIG. 1.

Referring now to FIG. 2, there is shown a schematic diagram of optical system 114 of dual-camera optics 104 of FIG. 1. Optical system 114 includes objective lens 202, beamsplitter 204, small focal gradient camera 206, and large focal gradient camera 208. Small focal gradient camera 206 includes aspherical lens 210 and CCD line-scan array 212. Large focal gradient camera 208 includes neutral density filter 214, aspherical lens 216, and CCD line-scan array 218. Aperture 220 of small focal gradient camera 206 is smaller than aperture 222 of large focal gradient camera 208.

In a preferred embodiment, ambient light is reflected from the surface of a package and passes through objective lens 202 to beamsplitter 204. Beamsplitter 204 transmits some radiation to camera 206 and reflects some radiation to camera 208. Cameras 206 and 208 simultaneously generate images of the top of the package. Since cameras 206 and 208 have different aperture sizes, cameras 206 and 208 have different f-numbers and different focal gradients. Camera 206, having a relatively small aperture 220, has a relatively large f-number and a relatively small focal gradient. On the other hand, camera 208, having a relatively large aperture 222, has a relatively small f-number and a relatively large focal gradient.

The specific characteristics of the optical components of optical system 114 of dual-camera optics 104 depend on the particular application and may be selected empirically. In general, the larger the ratio of camera 206 f-number to camera 208 f-number, the more accurate are the blur-spread estimates and hence the more accurate are the generated ranges. The specific component characteristics described below apply to a preferred embodiment of the present invention designed to provide a depth-of-view of approximately 24 inches and a field-of-view of approximately 18 inches.

Lens 202 may be a conventional biconvex objective lens and preferably has a focal length of 300 mm. Beamsplitter 204 may be a conventional plate beamsplitter and is preferably a 30/70 split beamsplitter. Lenses 210 and 216 may be conventional aspherical lenses and preferably have focal lengths of 8.5 mm. Filter 214 may be a conventional neutral density filter and is preferably selected empirically to prevent small f-number camera 208 from saturating when a package remains within the field of view. Arrays 212 and 218 may be conventional CCD line-scan arrays and are preferably 256-element CCD line scan arrays. In a preferred embodiment, camera 206 has an f-number of 12.5 and camera 208 has an f-number of 1.25. In alternative preferred embodiments, f-numbers for cameras 206 and 208 are selected to provide an f-number ratio of greater than 10.

Objective lens 202 determines the focal lengths of cameras 206 and 208. Beamsplitter 204 allows cameras 206 and 208 to generate simultaneous images with cameras 206 and 208 oriented at right angles to one another. Filter 214 attenuates the light received by large-aperture camera 208 to ensure that the images generated by cameras 206 and 208 have similar intensity levels. Aspherical lenses 210 and 216 provide space for beamsplitter 204 and permit optimization of the optical characteristics of optical system 114 for the wavelengths of the ambient light. In a preferred embodiment, the ambient light is generated by a sodium arc lamp which illuminates packages for high-resolution imaging by camera 110 of FIG. 1.

Figure 3:
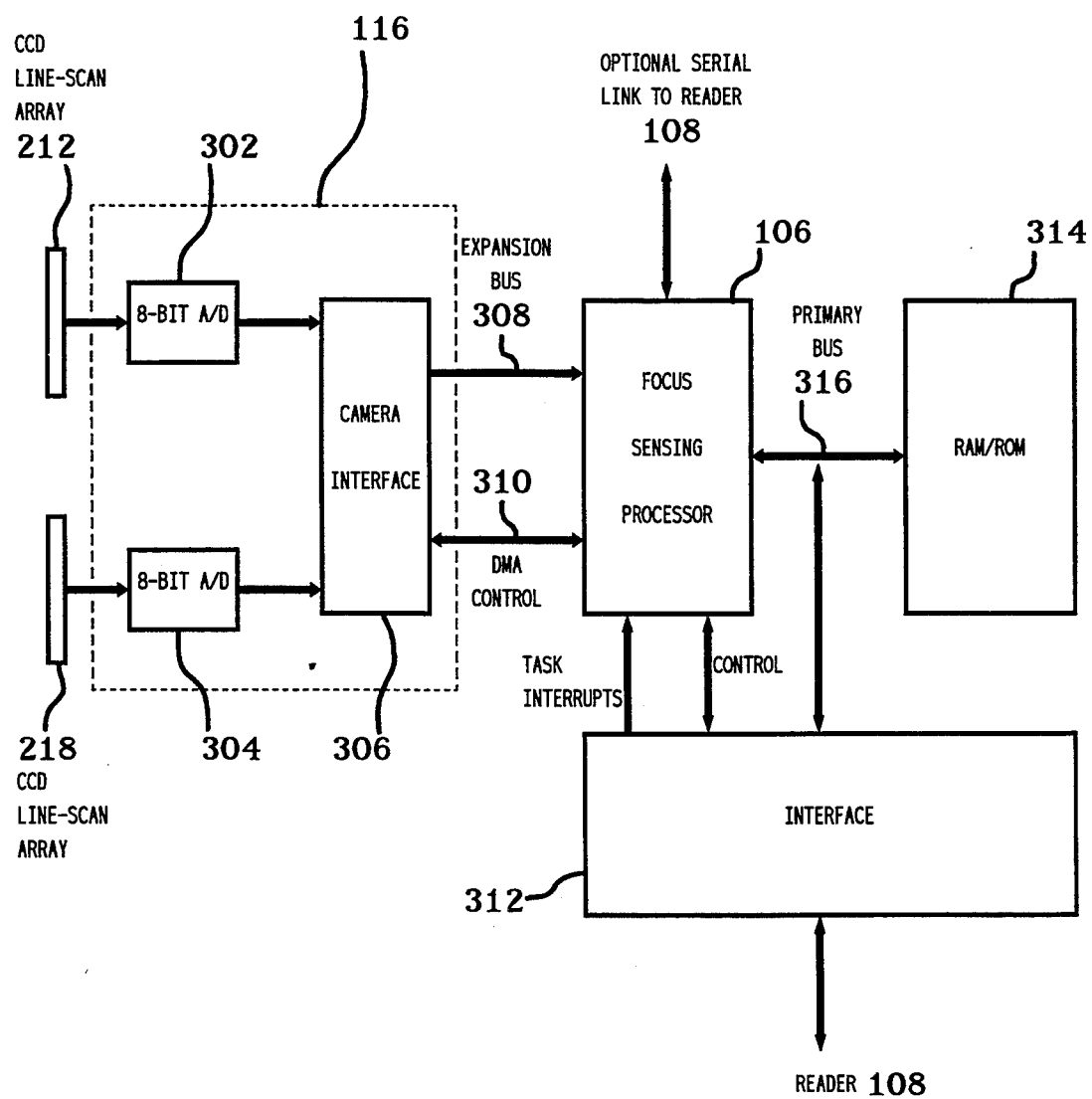
FIG. 3 is a block diagram of the camera hardware of the dual-camera optics and the focus sensing processor of the system of FIG. 1.

Referring now to FIG. 3, there is shown a block diagram of camera hardware 116 of dual-camera optics 104 and focus sensing processor 106 of FIG. 1 according to a preferred embodiment of the present invention. CCD line-scan arrays 212 and 218 are the arrays of cameras 206 and 208, respectively, as shown in FIG. 2. Arrays 212 and 218 transmit analog pixel data to 8-bit A/D converters 302 and 304, respectively. The digitized pixel data is then transmitted to camera interface 306 which stores the digital pixel data for transmission to focus sensing processor 106 via expansion bus 308. Bus 310 provides direct memory access (DMA) control lines allowing direct access to RAM memory 314 from camera interface 306. Camera interface 306 transfers image data directly to memory 314, independent of focus sensing processor 106.

Focus sensing processor 106 employs a relaxation procedure to process the two digital images generated by cameras 206 and 208 to calculate the focus distance for high-resolution camera 110, which is transmitted to label reader 108 via interface 312. The relaxation procedure implemented by focus sensing processor 106 is described in greater detail later in this specification in conjunction with FIG. 4. Focus sensing processor 106 also stores data to and accesses data from RAM/ROM memory 314 via primary bus 316.

Converters 302 and 304 may be conventional 8-bit A/D converters and are preferably flash-type converters. Interface 306 is preferably a custom-made interface that allows transfer of camera data to RAM memory 314. Buses 308, 310, and 316 are preferably conventional bit-parallel digital buses. Focus sensing processor 106 is a digital signal processor preferably based on a Texas Instruments TMS30C30 Processor. Interface 312 is preferably a custom-made interface. Memory 314 is preferably a mixture of static RAM and EPROM.

Figure 4:
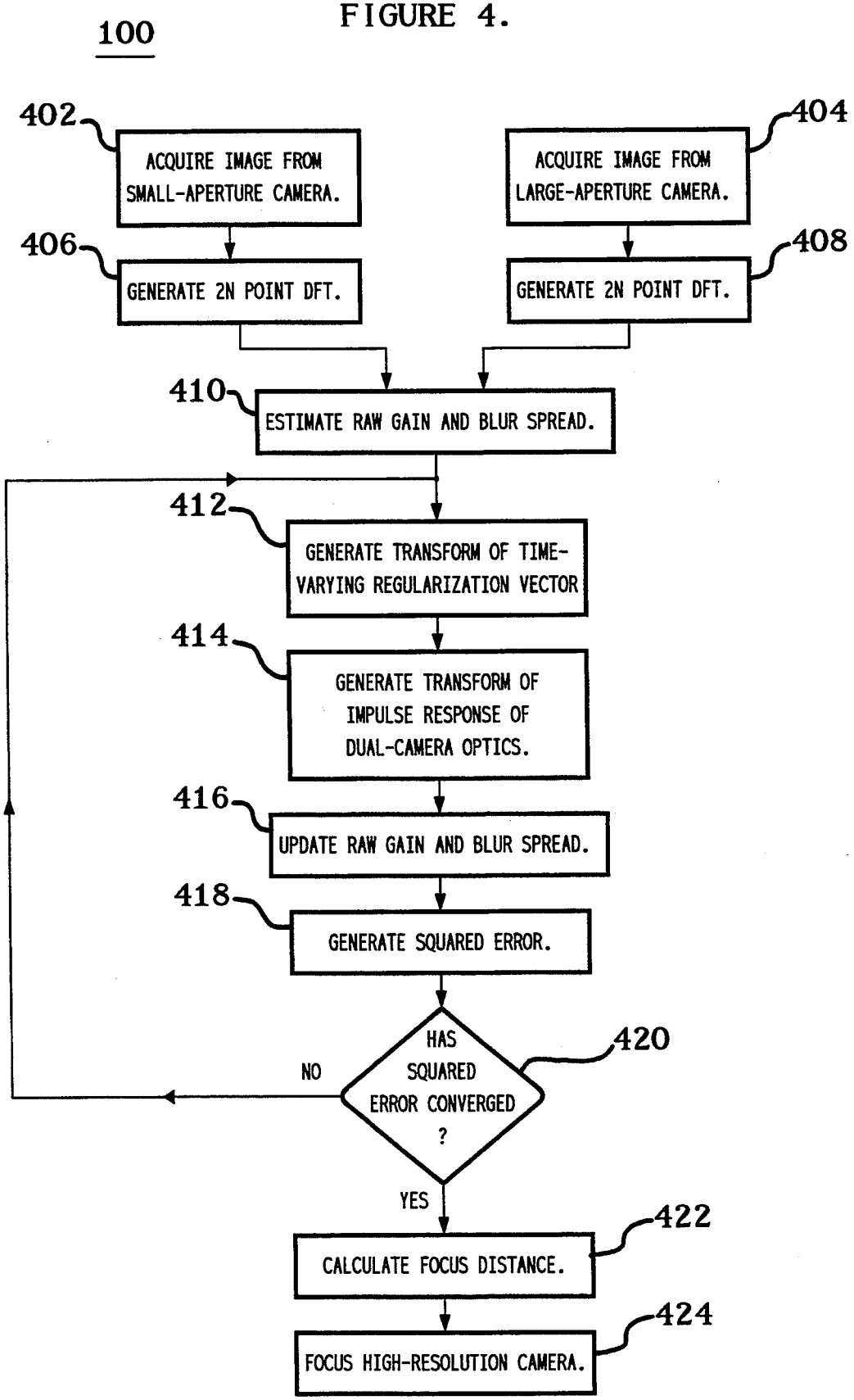
FIG. 4 is a block flow diagram of the processing of the system of FIG. 1.

Referring now to FIG. 4, there is shown a block flow diagram of the processing implemented by system 100 of FIG. 1 for passive autofocussing of a high-resolution camera according to a preferred embodiment of the present invention. According to this processing, the two images generated by dual-camera optics 104 are processed by focus sensing processor 106 according to a temporal relaxation procedure to generate a blur-spread estimate. The relaxation procedure is an non-linear iterative procedure that is repeated until an acceptable blur-spread estimate is generated. The blur-spread estimate is then used to calculate the focus distance used by label reader 108 to focus high-resolution camera 110.

In particular, step 402 of system 100 acquires the small-focal-gradient image from small-aperture camera 206 of FIG. 2. Simultaneously, step 404 acquires the large-focal-gradient image from large-aperture camera 208. Step 406 generates a 2N point discrete Fourier transform (DFT) of the small-focal-gradient image and step 408 generates a 2N point DFT of the large-focal-gradient image. The DFT is preferably calculated by a fast Fourier transform (FFT) algorithm, such as the algorithm described in *Digital Signal Processing* by Oppenheim and Schafer, Prentice-Hall, 1975.

Step 410 uses the two DFT's of the two images to estimate the raw gain $\kappa$ and blur spread $\sigma$ according to Equations (1) and (2) below:

$$\kappa = \exp\left( \frac{\left(\sum_j j^4\right)A(j) - \left(\sum_j j^2\right)B(j)}{2\left(N\sum_j j^4 - \left(\sum_j j^2\right)^2\right)} \right) \quad (1)$$

and $$\sigma = \sqrt{2\frac{\left(\sum_j j^2\right)A(j) - NB(j)}{N\sum_j j^4 - \left(\sum_j j^2\right)^2}}, \quad (2)$$

where:

$$A(j) = \sum_j [\log P_l(j) - \log P_s(j)]$$

and $$B(j) = \sum_j j^2[\log P_l(j) - \log P_s(j)],$$

where $P_l(j)$ is sample $j$ of the power spectrum $P_l$ of the large-focal-gradient image; $P_s(j)$ is sample $j$ of the power spectrum $P_s$ of the small-focal-gradient image;

and N is the number of pixels in each image. The power spectra $P_l$ and $P_s$ are generated according to Equations (3) and (4) as follows:

$$P_l = D_l^* D_l \tag{3}$$

and $$P_s = D_s^* D_s \tag{4}$$

where $D_l$ is the 2N point DFT of the large-focal-gradient image generated by step 408; $D_s$ is the 2N point DFT of the small-focal-gradient image generated by step 406; $D_l^*$ is the complex conjugate of $D_l$; and $D_s^*$ is the complex conjugate of $D_s$.

Step 412 generates the transform $\overline{G}$ of the time-varying regularization vector according to Equation (5) as follows:

$$\overline{G} = \left[ \kappa, \kappa \exp\left(\frac{-\sigma^2}{4}\right), \ldots, \kappa \exp\left(\frac{-(N-1)^2 \sigma^2}{4}\right), \right. $$
$$\left. \ldots, \kappa \exp\left(\frac{-\sigma^2}{4}\right), \kappa \right]^t \tag{5}$$

Step 414 generates an estimate of the transform $\overline{H}$ of the impulse response of dual-camera optics 104 of FIG. 1 according to Equation (6) as follows:

$$\overline{H} = \text{diagonal}\left[ \frac{1}{x_j^* x_j + \mu} \right](X^* \overline{D}_1 + \mu \overline{G}), \tag{6}$$

where $X^*$ is the complex conjugate of $X$; $X$ is the diagonal matrix of the DFT of the small-focal-gradient image, such that $X = \text{diagonal}\ [X_j; k = 0, 1, \ldots, 2N-1]$; $\mu$ is the fixed regularization parameter; $x_j^*$ is the complex conjugate of $x_j$; and $x_j$ is sample $[j,j]$ along the diagonal of the DFT of the small-focal-gradient image. The fixed regularization parameter $\mu$ may be empirically determined and preferably has a value of 100. The value of regularization parameter $\mu$ is selected empirically to provide a good fit to the camera model and sufficient dynamic range of blur-spread estimates. The larger the value of $\mu$, the smaller the dynamic range, but the better the fit to the camera model.

Step 416 updates the current estimates for the raw gain $\kappa$ and the blur spread $\sigma$ according to Equations (7) and (8) as follows:

$$\kappa = \exp\left( \frac{\left(\sum_j j^4\right) F(j) - \left(\sum_j j^2\right) G(j)}{2\left(N \sum_j j^4 - \left(\sum_j j^2\right)^2\right)} \right) \tag{7}$$

and $$\sigma = \sqrt{2 \frac{\left(\sum_j j^2\right) F(j) - N G(j)}{N \sum_j j^4 - \left(\sum_j j^2\right)^2}} \tag{8}$$

where:

$$F(j) = \sum_j \log[H(j) H^*(j)]$$

and $$G(j) = \sum_j j^2 \log[H(j) H^*(j)]$$

Step 418 generates the current squared error $E_{squared}$ according to Equation (9) as follows:

$$E_{squared} = \sum_{j=0}^{N-1} \left( \log\left[ (H(j) H^*(j)] - \kappa + \frac{\sigma^2 j^2}{2} \right)^2, \tag{9}$$

where $H(j)$ is the $j^{th}$ sample of the transform $\overline{H}$ of the impulse response of dual-camera optics 104 and $H^*(j)$ is the complex conjugate of $H(j)$.

Step 420 then determines whether the current blur-spread estimate $\sigma$ is acceptable by testing for convergence of the squared error $E_{squared}$. In a preferred embodiment, step 420 determines whether the magnitude of the difference between the current squared error and the previous squared error (i.e., the squared error from the previous iteration cycle) is less than or equal to a specified threshold. If not, then the squared error has not yet sufficiently converged and processing returns to repeat the processing of step 412 through 420. Processing continues to iterate until step 420 determines that the squared error has converged. At that time, processing proceeds to step 422.

Step 422 calculates the focus distance $d_i$ for high-resolution camera 110 according to Equation (10) below:

$$d_i = c_1 \left( \frac{c_2 + \sigma}{c_3 + \sigma} \right), \tag{10}$$

where $c_1$, $c_2$, and $c_3$ are calibrated values for mapping from large-aperture camera 208 to high-resolution camera 110.

The values for $c_1$, $c_2$, and $c_3$ are determined during a two-step calibration procedure. The first step is to acquire a N sets of pairs of focus distances $d_i$ and blur-spread estimates $\sigma_i$ by manually focussing high-resolution camera 110 on packages of different heights and determining the corresponding blur-spread estimates in images generated with dual-camera optics 104. The second step is to solve a set of three linear equations that minimize the cost function E with respect to $c_1$, $c_3$, and K, where the cost function E is given by:

$$E = \sum_{i=1}^{N} (c_3 d_i - c_1 \sigma_i - K + d_i \sigma_i)^2$$

After step 422 calculates the focus distance $d_i$, step 424 then focusses high-resolution camera 110 based on the calculated focus distance $d_i$. In a preferred embodiment of the present invention, focus sensing processor 106 implements steps 402 through 422 and label reader 108 implements step 424.

Those skilled in the art will understand that dual-camera optics 104 and focus sensing processor 106 may be designed for a range-finding system that determines the distance between dual-camera optics 104 and an imaged object. Such a system may or may not focus a camera.

Those skilled in the art will also understand that means other than dual-camera optics 104 may be used to generate the two images that are inputs to the relaxation procedure of the present invention. For example, two cameras having different parameters such as aperture size, focal length, and/or distance between the second principal plane and the image detector plane will have different focal gradients and may be used to generate the two images. Moreover, a single camera may be used to generate the two images if the focal gradient of the camera is changed from one image to the other.

Multiple Range-Finding Using Spatial Relaxation

Figure 5:
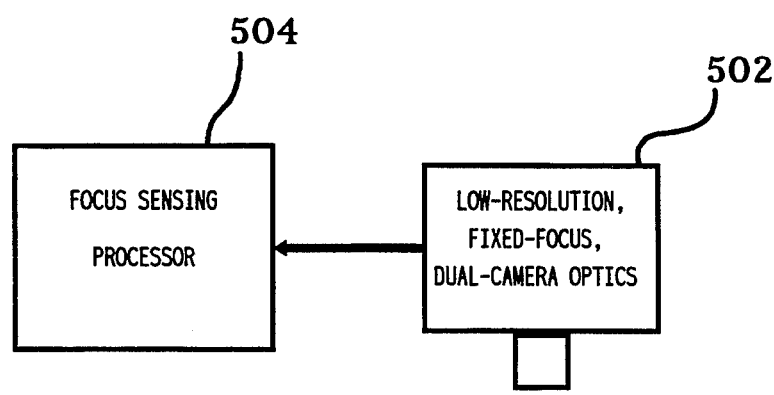
FIG. 5 is a block diagram of a system for determining the heights of a plurality of stacks of nested packages according to a preferred embodiment of the present invention.
Figure 5:
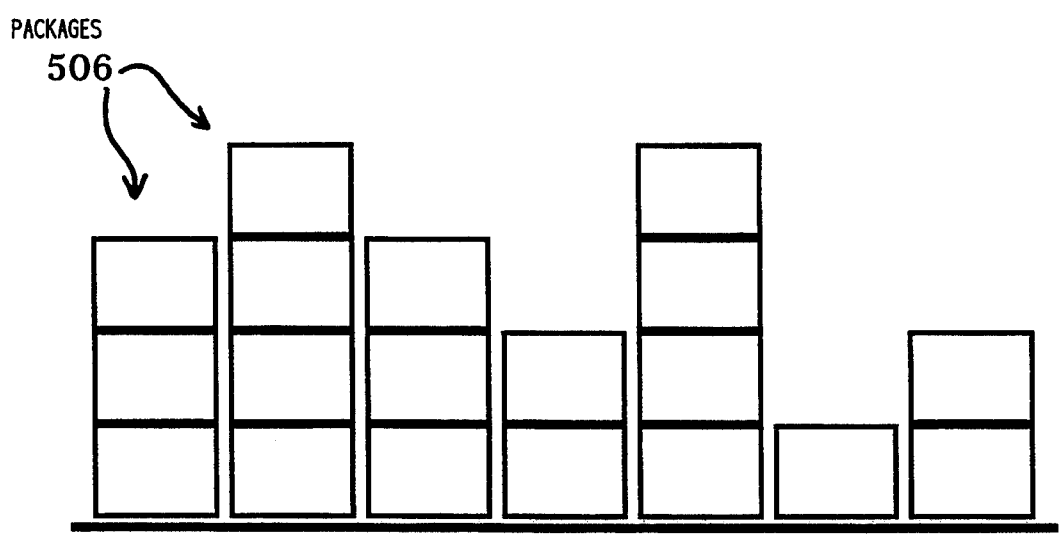

Referring now to FIG. 5, there is shown a block diagram of system 500 for determining the heights of a plurality of stacks of nested packages according to a preferred embodiment of the present invention. System 500 includes low-resolution, fixed-focus, dual-camera optics 502 and focus sensing processor 504.

Dual-camera optics 502 is positioned above a plurality of stacks of nested packages 506. Dual-camera optics 502 has two cameras with different focal gradients and generates two images of the tops of the stacks of nested packages 50e within the field of view of dual-camera optics 502. Both images are transmitted to focus sensing processor 504, which performs a spatial relaxation procedure based on the two images to generate a blur-spread estimate for each image sample (i.e., pixel). Each image sample corresponds to a different position in the field of view of dual-camera optics 502. Focus sensing processor 504 calculates a range value from each blur-spread estimate, where each range value corresponds to the height of a stack of nested packages 506.

In a preferred embodiment of system 500, the hardware of dual-camera optics 502 and focus sensing processor 504 is identical to that of dual-camera optics 104 and focus sensing processor 106 of system 100 of FIG. 1, respectively. The processing implemented by focus sensing processor 504, however, differs from the processing of focus sensing processor 106.

Figure 6:
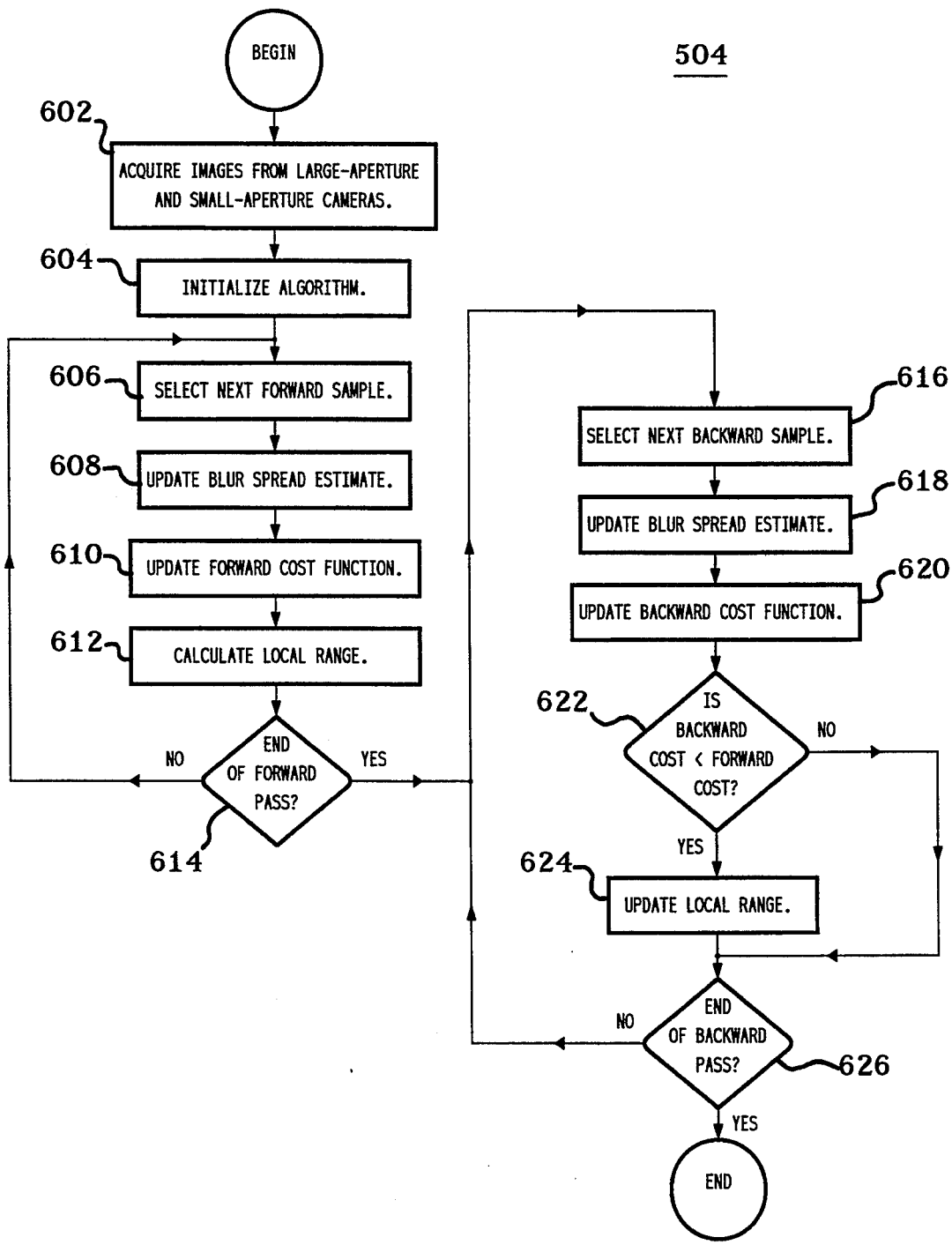
FIG. 6 is a block flow diagram of the processing of the system of FIG. 5.

Referring now to FIG. 6, there is shown a block flow diagram of the processing of focus sensing processor 504 according to a preferred embodiment of the present invention. Focus sensing processor 504 uses the two images generated by dual-camera optics 502 of FIG. 5 as inputs to a spatial relaxation procedure. The spatial relaxation procedure includes two spatial passes through the image data: a forward pass in one direction and a backward pass in the opposite direction.

During the forward pass, focus sensing processor 504 sequentially selects samples from the large-focal-gradient image generated by the large-aperture camera of dual-camera optics 502 and corresponding samples from the small-focal-gradient image generated by the small-aperture camera of dual-camera optics 502. Focus sensing processor 504 generates a forward blur-spread estimate for each sample pair. Each blur-spread estimate is based in part on the blur-spread estimates for the previously selected samples. From each blur-spread estimate, focus sensing processor 504 calculates a forward cost function value and a range value.

After the forward pass is complete, focus sensing processor 504 performs analogous processing in a backward pass through the image data, in which the image samples are selected in the opposite order from those in the forward pass. Focus sensing processor 504 generates a backward blur-spread estimate and a backward cost function value for each sample during the backward pass. If the backward cost function value for a particular sample is less than the forward cost function value for the same sample, then focus sensing processor 504 updates the range value for that sample using the backward blur-spread estimate. When the backward pass is complete, focus sensing processor 504 will have generated a set of range values, each of which corresponds to a different image sample and therefore to a different position within the field of view of dual-camera optics 502. These range values can then be used to determine the various heights of the stacks of nested packages.

In particular, step 602 of focus sensing processor 504 acquires corresponding images from the large-aperture and small-aperture cameras of dual-camera optics 502. Step 604 initializes the preferred spatial relaxation algorithm according to Equations (11)-(14) below:

$$R(0) = 0 \tag{11}$$

$$\overline{\Theta}(0) = 0 \tag{12}$$

$$\overline{w}(0) = [1\ 0\ \ldots\ 0]^t \tag{13}$$

$$\sigma(0) = 1.0 \tag{14}$$

where $R(0)$ is the initialized covariance matrix; $\overline{\Theta}(0)$ is the initialized cross-correlation vector; $\overline{w}(0)$ is the initialized weight vector; and $\sigma(0)$ is the initialized blur-spread estimate.

Step 606 selects the next forward sample n, where $n = 1, \ldots, M$, where M is the number of samples in each image. Step 608 then updates the blur-spread estimate for the current sample.

Figure 7:
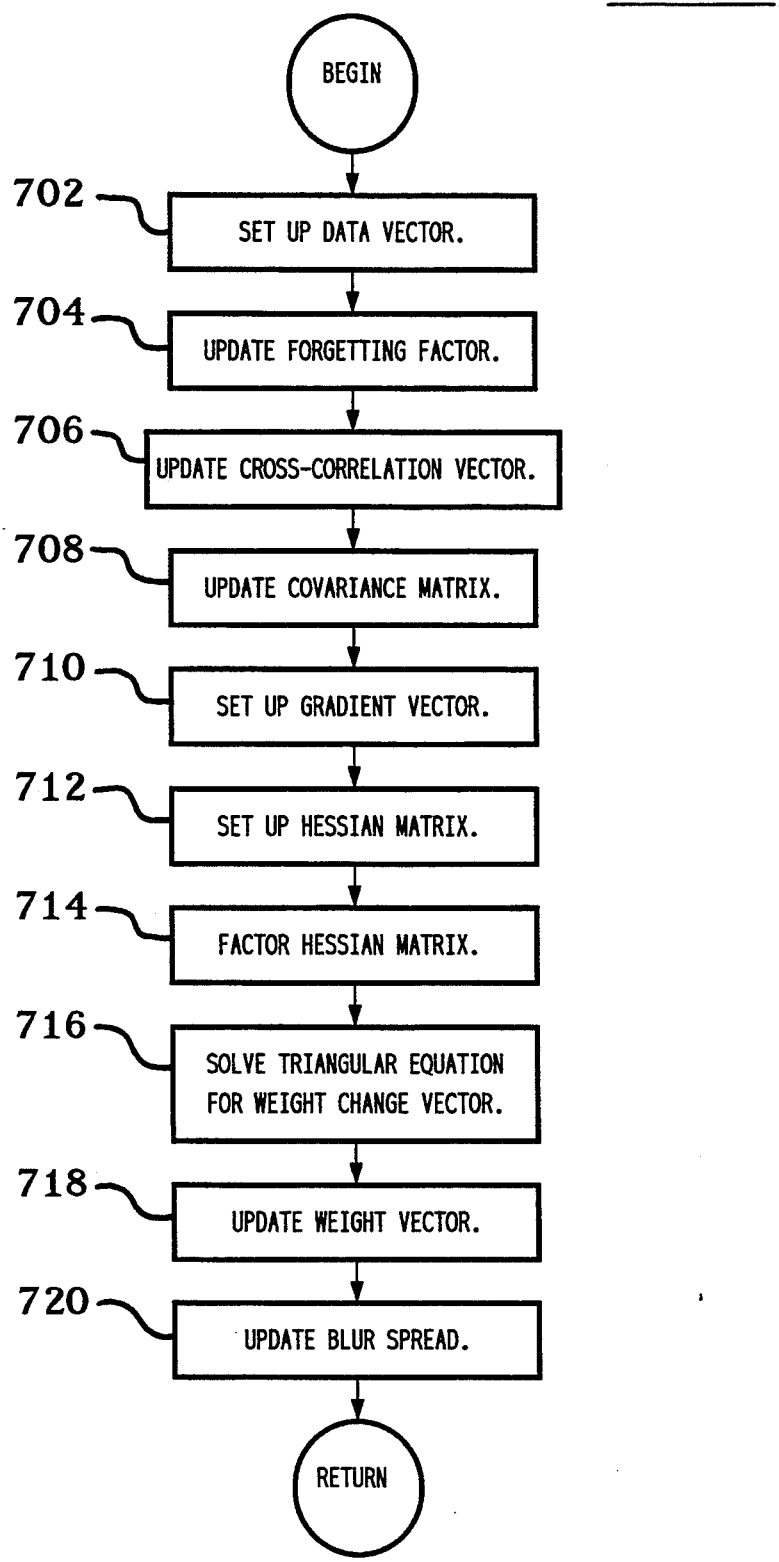
FIG. 7 is a block flow diagram of the processing of the means of the system of FIG. 5 for updating the blur-spread estimate for the current sample.

Referring now to FIG. 7, there is shown a block flow diagram of the processing of step 608 of FIG. 6 for updating the blur-spread estimate for the current sample. Step 702 of step 608 sets up a data vector $\overline{u}(n)$ according to Equation (15) below:

$$\overline{u}(n) = [x(n), x(n-1) + x(n+1), \ldots, x(n-M+1) + x(n+M-1), 1]^t \tag{15}$$

where $x(n)$ is the $n^{th}$ sample from the small-focal-gradient image.

Step 704 updates a spatially variant forgetting factor $\lambda(n)$ according to Equation (16) below:

$$\lambda(n) = \lambda_{min} + \frac{(1 - \lambda_{min})}{(\beta ||\nabla x(n)||^2 + 1)} \tag{16}$$

where $\lambda_{min}$ is the minimum forgetting factor value and $\beta$ is a scale factor. The minimum forgetting factor value $\lambda_{min}$ and the scale factor $\beta$ may be empirically determined and preferably have values of 0.90 and 1.0, respectively.

Step 706 updates the cross-correlation vector $\overline{\Theta}(n)$ recursively according to Equation (17) below:

$$\overline{\Theta}(n) = \lambda(n)\overline{\Theta}(n-1) + d(n)\overline{u}(n) \tag{17}$$

where $d(n)$ is $n^{th}$ sample from the large-focal-gradient image.

Step 708 updates the covariance matrix $R(n)$ recursively according to Equation (18) below:

$$R(n) = \lambda(n)R(n-1) + \overline{u}(n)\overline{u}(n) \tag{18}$$

where $\bar{u}^t(n)$ is the transpose of the data vector $\bar{u}(n)$.

Step 710 sets up a gradient vector $\nabla E(n)$, which is the derivative of a scalar cost function $E(n)$ with respect to a weight vector $\bar{w}(n)$. Step 712 sets up a Hessian matrix $H(n)$, which is the second derivative of the scalar cost function $E(n)$ with respect to the weight vector $\bar{w}(n)$ and is given according to Equation (19) below:

$$H(n) = \frac{\partial^2 E(n)}{\partial \bar{w}(n) \partial \bar{w}^t(n)} \qquad (19)$$

The weight vector $\bar{w}(n)$ and the scalar cost function $E(n)$ are given below by Equations (21) and (23), respectively. The gradient vector $\nabla E(n)$ and the Hessian matrix $H(n)$ are computed using the weight vector $\bar{w}(n-1)$ and blur-spread estimate $\sigma(n-1)$ from the previous sample $n-1$, but using the data vector $\bar{u}(n)$ from the current sample $n$.

Step 714 factors the Hessian matrix $H(n)$ into the product of triangular matrices by the Cholesky reduction algorithm, as described in *Introduction to Matrix Computations*, by Stewart, Academic Press, 1973.

Means 716 determines a weight change vector $\Delta \bar{w}(n)$ by solving a triangulation equation given by Equation (20) below:

$$H(n)\Delta \bar{w}(n) = \nabla E(n) \qquad (20)$$

Step 718 updates the weight vector $\bar{w}(n)$ according to Equation (21) below:

$$\bar{w}(n) = \bar{w}(n-1) - \alpha \Delta \bar{w}(n) \qquad (21)$$

where $\alpha$ is the learning rate. The learning rate $\alpha$ may be empirically determined and preferably has a value of 1.0.

Step 720 updates the blur-spread estimate $\sigma(n)$ for the current sample $n$ according to Equation (22) below:

$$\sigma(n) = \sqrt{\frac{\left(\sum_k w_k^2\right)\left(\sum_k k^4 w_k^2\right) - \left(\sum_k k^2 w_k^2\right)^2}{\left(\sum_k k^2 w_k^2\right)\left(\sum_k w_k^2 \log(w_k)\right) - \left(\sum_k w_k^2\right)\left(\sum_k k^2 w_k^2 \log(w_k)\right)}} \qquad (22)$$

where $w_k$ is the $k^{th}$ element of the weight vector $\bar{w}(n)$.

Referring again to FIG. 6, after step 608 updates the blur-spread estimate $\sigma(n)$, step 610 updates the forward cost function $E(n)$ according to Equation (23) below:

$$E(n) = \sum_{i=1}^{n} [\lambda(i)]^{n-i} [d(i) - \bar{u}^t(i)\bar{w}(n)]^2 + \sum_{k=1}^{4} \mu_k c_k(\bar{w}(n)) \qquad (23)$$

where $\bar{u}^t(i)$ is the transpose of the data vector $\bar{u}(i)$; $\mu_k$ for $k=1,2,3,4$ are four regularization parameters; and $c_k(w(n))$ for $k=1,2,3,4$ are four constraint functions. The four regularization parameters may be empirically determined and preferably have values ($\mu_1=100.0$); ($\mu_2=0.01$); ($\mu_3=1.0$); and ($\mu_4=1.0$). As with the temporal relaxation method, the values of the four regularization parameters $\mu_k$ for the spatial relaxation method are selected to provide accurate blur/range estimates and sufficient dynamic range.

The four constraint functions $c_k(w(n))$ are given by Equations (24)–(27) below:

$$c_1(\bar{w}(n)) = \sum_{k=1}^{M-1} \left[ w_k - w_0 \exp\left(-\frac{k^2}{\sigma^2(n-1)}\right) \right]^2 \qquad (24)$$

$$c_2(\bar{w}(n)) = \left(\frac{1}{w_0^2}\right) \sum_{k=1}^{M-1} w_k^2 \qquad (25)$$

$$c_3(\bar{w}(n)) = \left\| \frac{d}{dn} \bar{w}(n) \right\|^2 \qquad (26)$$

$$c_4(\bar{w}(n)) = \left\| \frac{d^2}{dn^2} \bar{w}(n) \right\|^2 \qquad (27)$$

where $w_0$ is the $0^{th}$ element of the weight vector $\bar{w}(n)$ and $\sigma^2(n-1)$ is the square of the blur-spread estimate from the previous sample $(n-1)$. The first and second derivatives in Equations (26) and (27) may be approximated according to Equations (28) and (29) below:

$$\frac{d}{dn} \bar{w}(n) \approx \bar{w}(n) - \bar{w}(n-1) \qquad (28)$$

$$\frac{d^2}{dn^2} \bar{w}(n) \approx \bar{w}(n) - 2\bar{w}(n-1) + \bar{w}(n-2) \qquad (29)$$

where $\bar{w}(n)$ is the local average of past weight vectors and is generated according to Equation (30) below:

$$\bar{w}(n) = \frac{1}{p} \sum_{j=n-p+1}^{n} \bar{w}(j) \qquad (30)$$

where $p$ is an integer that specifies the number of previous samples used to generate the local average $\bar{w}(n)$. $p$ may be empirically determined and preferably has a value of 3.0.

After step 610 updates the forward cost function $E(n)$, step 612 calculates the local range $z(n)$ for the current sample $n$ according to Equation (31) below:

$$z(n) = z_m \frac{A + \sigma(n)}{B + \sigma(n)} \qquad (31)$$

where $z_m$, A, and B are calibration parameters.

The method of determining values for the calibration parameters $z_m$, A, and B for the spatial relaxation method is analogous to the two-step calibration method for the temporal relaxation method described earlier in this specification. The first step is to acquire a N sets of pairs of focus distances $z_i$ and blur-spread estimates $\sigma_i$ by manually focussing high-resolution camera 110 on a target with a known profile and determining the corresponding blur-spread estimates across an image generated with dual-camera optics 104. The second step is to solve a set of three linear equations that minimize the cost function E with respect to B, $z_m$, and C, where the cost function E is given by:

$$E = \sum_{i=1}^{N} (Bz_i - z_m\sigma_i - C + z_i\sigma_i)^2$$

where:

$$A = C/z_m.$$

Step 614 determines whether the forward pass through the image data is complete (i.e., whether every sample has been selected for processing). If not, then processing returns to step 606 to select the next forward sample for processing by step 608, 610, and 612. Otherwise, the forward pass is complete and processing continues to step 616 to select the first sample for the backward pass through the image data. In a preferred embodiment, step 616 begins the backward pass by reselecting the last sample from the forward pass as the first sample for the backward pass. In addition, the relaxation algorithm is preferably not reinitialized at the beginning of the backward pass.

Step 618 and 620 update the blur-spread estimate $\sigma(n)$ and cost function $E(n)$, respectively, for the current sample n during the backward pass. In a preferred embodiment, the processing of step 618 and 620 is analogous to that performed by step 608 and 610, respectively, as already described above. As in the forward pass, during the backward pass, in computing the value of the cost function $E(n)$, the term due to the data (i.e., the first summation in Equation (23) above) is averaged, while the term due to the constraints (i.e., the second summation in Equation (23) above) is not averaged.

Step 622 compares the backward cost function value with the corresponding forward cost function value for the current sample. If the backward cost function value is less than the forward cost function value, then step 624 updates the local range value $z(n)$ using the blur-spread estimate $\sigma(n)$ from the backward pass. In a preferred embodiment, step 624 employs processing analogous to that of step 612.

Step 626 then determines whether the backward pass through the image data is complete. If not, then processing returns to step 616 to select the next sample in the backward pass. Otherwise, processing of focus sensing processor 504 is complete. The resulting range values $z(n)$ correspond to the heights of the stacks of nested packages in the field of view of dual-camera optics 502.

Those skilled in the art will understand that systems within the scope of the present invention may be used to determine the distances between dual-camera optics 502 and one or more objects other than stacks of nested packages.

It will also be understood by those skilled in the art that systems falling within the scope of the present invention may employ relaxation methods other than the specific temporal and spatial relaxation methods described in this specification. For example, the camera's power spectrum may be estimated by regularization with a cylindrical sinc function. Such a system uses the same temporal relaxation algorithm as described earlier in this specification in conjunction with FIG. 4, except that a cost function based on a cylindrical sinc function in frequency is used instead of the gaussian-based cost function $E_{squared}$ of Equation (9) above. Such a system may be useful for optical testing (i.e., determining just how well focussed a lens is or how well the details of a scene may be imaged).

In another alternative preferred embodiment, a robot may used the spatial relaxation method to determine depth profiles for stacking packages or other operations.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for determining a differential blur spread corresponding to an object, comprising the steps of:
    (a) providing a first image of said object, said first image being generated by a camera having a first camera parameter;
    (b) providing a second image of said object, said second image being generated by a camera having a second camera parameter different from said first camera parameter; and
    (c) performing a relaxation procedure in accordance with said first and second images to generate said differential blur spread.

2. The method of claim 1, further comprising the step of:
    (d) determining a range of said object in accordance with said differential blur spread.

3. The method of claim 2, further comprising the step of:
    (e) focussing a camera in accordance with said range.

4. The method of claim 3, wherein said object is a package on a conveyor system and said focussed camera is a high-resolution camera positioned overhead said conveyor system to generate images used to read a label on said package.

5. The method of claim 1, wherein said first camera parameter is a first focal gradient and said second camera parameter is a second focal gradient.

6. The method of claim 1, wherein:
    step (a) comprises the step of generating said first image with a first camera having a first aperture size; and
    step (b) comprises the step of generating said second image with a second camera having a second aperture size, said second aperture size being different from said first aperture size.

7. The method of claim 1, wherein:
    step (a) comprises the step of generating said first image with a first camera having a first focal length; and
    step (b) comprises the step of generating said second image with a second camera having a second focal length, said second focal length being different from said first focal length.

8. The method of claim 1, wherein:
    step (a) comprises the step of generating said first image with a first camera having a first distance between a second principal plane and an image detector plane of said first camera; and
    step (b) comprises the step of generating said second image with a second camera having a second distance between a second principal plane and an image detector plane of said second camera, said second distance being different from said first distance.

9. The method of claim 1, wherein step (c) comprises the step of performing a temporal relaxation procedure in accordance with said first and second images to generate said differential blur spread.

10. The method of claim 1, wherein step (c) comprises the steps of:
    (1) generating a 2N point discrete Fourier transform of said first image;
    (2) generating a 2N point discrete Fourier transform of said second image;

(3) generating a raw gain and said differential blur spread in accordance with said 2N point discrete Fourier transforms of said first and second images;

(4) generating a transform of a time-varying regularization vector in accordance with said raw gain and said differential blur spread;

(5) generating a transform of an impulse response in accordance with said time-varying regularization vector and said 2N point discrete Fourier transforms of said first and second images;

(6) updating said raw gain and said differential blur spread in accordance with said impulse response;

(7) generating a squared error in accordance with said impulse response, said updated raw gain, and said updated differential blur spread;

(8) testing said squared error for convergence; and (9) repeating steps (c)(4) through (c)(7) in accordance with said testing of step (c)(8).

11. The method of claim 1, wherein step (c) comprises the step of performing a spatial relaxation procedure in accordance with said first and second images to generate said differential blur spread.

12. The method of claim 11, wherein:
step (c) comprises the step of performing said spatial relaxation procedure in accordance with a forward pass through said first and second images to generate a plurality of forward differential blur spreads and a plurality of forward cost function values; and further comprising the steps of:

(d) determining a plurality of ranges corresponding to a plurality of objects in accordance with said plurality of forward differential blur spreads;

(e) performing said spatial relaxation procedure in accordance with a backward pass through said first and second images to generate a plurality of backward differential blur spreads and a plurality of backward cost function values;

(f) comparing said plurality of backward cost function values with said plurality of forward cost function values; and (g) updating said plurality of ranges in accordance with said comparison of step (f).

13. The method of claim 1, wherein step (c) comprises the steps of:

(1) selecting a first first-image sample from said first image and a corresponding first second-image sample from said second image;

(2) generating a first differential blur spread in accordance with said first first-image and first second-image samples;

(3) selecting a second first-image sample from said first image and a corresponding second second-image sample from said second image; and (4) generating a second differential blur spread in accordance with said second first-image and second second-image samples.

14. The method of claim 13, further comprising the steps of:

(d) determining a first range value corresponding to said first first-image and second-image samples in accordance with said first differential blur spread; and (e) determining a second range value corresponding to said second first-image and second-image samples in accordance with said second differential blur spread.

15. The method of claim 14, wherein said first range value corresponds to the height of a first stack of nested packages and said second range value corresponds to the height of a second stack of nested packages.

16. The method of claim 1, wherein:
step (a) comprises the step of providing said first image with a first camera having a focal length, an aperture size, and a distance between a second principal plane and an image detector plane of said first camera, and step (c) comprises the step of performing said relaxation procedure independent of said focal length, said aperture size, and said distance of said first camera.

17. An apparatus for determining a differential blur spread corresponding to object, comprising:

(a) a camera, having a first camera parameter, for providing a first image of said object;

(b) camera means, having a second camera parameter, for providing a second image of said object, said second camera parameter being different from said first camera parameter; and (c) means for performing a relaxation procedure in accordance with said first and second images to generate said differential blur spread.

18. The apparatus of claim 17, further comprising:
(d) means for determining a range of said object in accordance with said differential blur spread.

19. The apparatus of claim 18, further comprising:
(e) means for focussing a camera in accordance with said range.

20. The apparatus of claim 19, wherein said object is a package on a conveyor system and said camera is a high-resolution camera positioned overhead said conveyor system to generate images used to read a label on said package.

21. The apparatus of claim 17, wherein said first camera parameter is a first focal gradient and said second camera parameter is a second focal gradient.

22. The apparatus of claim 17, wherein:
camera (a) comprises a first camera having a first aperture size; and
camera means (b) comprises a second camera having a second aperture size, said second aperture size being different from said first aperture size.

23. The apparatus of claim 17, wherein:
camera (a) comprises a first camera having a first focal length; and
camera means (b) comprises a second camera having a second focal length, said second focal length being different from said first focal length.

24. The apparatus of claim 17, wherein:
camera (a) comprises a first camera having a first distance between a second principal plane and an image detector plane of said first camera; and
camera means (b) comprises a second camera having a second distance between a second principal plane and an image detector plane of said second camera, said second distance being different from said first distance.

25. The apparatus of claim 17, wherein means (c) comprises means for performing a temporal relaxation procedure in accordance with said first and second images to generate said differential blur spread.

26. The apparatus of claim 17, wherein means (c) comprises:

(1) means for generating a 2N point discrete Fourier transform of said first image and for generating a 2N point discrete Fourier transform of said second image;

(2) means for generating a raw gain and said differential blur spread in accordance with said 2N point discrete Fourier transforms of said first and second images;

(3) means for generating a transform of a time-varying regularization vector in accordance with said raw gain and said differential blur spread;

(4) means for generating a transform of an impulse response in accordance with said time-varying regularization vector and said 2N point discrete Fourier transforms of said first and second images;

(5) means for updating said raw gain and said differential blur spread in accordance with said impulse response;

(6) means for generating a squared error in accordance with said impulse response, said updated raw gain, and said updated differential blur spread; and (7) means for testing said squared error for convergence.

27. The apparatus of claim 17, wherein means (c) comprises means for performing a spatial relaxation procedure in accordance with said first and second images to generate said differential blur spread.

28. The apparatus of claim 27, wherein:

means (c) comprises means for performing said spatial relaxation procedure in accordance with a forward pass through said first and second images to generate a plurality of forward differential blur spreads and a plurality of forward cost function values; and further comprising:

(d) means for determining a plurality of ranges corresponding to a plurality of objects in accordance with said plurality of forward differential blur spreads;

(e) means for performing said spatial relaxation procedure in accordance with a backward pass through said first and second images to generate a plurality of backward differential blur spreads and a plurality of backward cost function values;

(f) means for comparing said plurality of backward cost function values with said plurality of forward cost function values; and (g) means for updating said plurality of ranges in accordance with said comparison of means (f).

29. The apparatus of claim 17, wherein means (c) comprises:

(1) means for:

(a) selecting a first first-image sample from said first image and a corresponding first second-image sample from said second image, and (b) selecting a second first-image sample from said first image and a corresponding second second-image sample from said second image; and (2) means for:

(a) generating a first differential blur spread in accordance with said first first-image and first second-image samples, and (b) generating a second differential blur spread in accordance with said second first-image and second second-image samples, 30. The apparatus of claim 29, further comprising:

(d) means for:

(1) determining a first range value corresponding to said first first-image and second-image samples in accordance with said first differential blur spread; and (2) determining a second range value corresponding to said second first-image and second-image samples in accordance with said second differential blur spread, 31. The apparatus of claim 30, wherein said first range value corresponds to the height of a first stack of nested packages and said second range value corresponds to the height of a second stack of nested packages.

32. The apparatus of claim 17, wherein:

camera (a) comprises a first camera having a focal length, an aperture size, and a distance between a second principal plane and an image detector plane of said first camera, and means (c) comprises means for performing said relaxation procedure independent of said focal length, said aperture size, and said distance of said first camera.

33. A method for determining a differential blur spread corresponding to an object, comprising the steps of:

(a) providing a first image of said object with a first camera having a first focal length, a first aperture size, a first distance between a second principal plane and an image detector plane of said first camera, and a first camera parameter;

(b) generating a second image of said object, said second image being generated with a camera having a second camera parameter different from said first camera parameter; and (c) generating said differential blur spread in accordance with said first and second images and independent of said first focal length, said first aperture size, and said first distance of said first camera.

34. The method of claim 33, further comprising the step of:

(d) determining a range of said object in accordance with said differential blur spread.

35. The method of claim 34, further comprising the step of:

(e) focussing a camera in accordance with said range.

36. The method of claim 35, wherein said object is a package on a conveyor system and said focussed camera is a high-resolution camera positioned overhead said conveyor system to generate images used to read a label on said package.

37. The method of claim 33, wherein said first camera parameter is a first focal gradient and said second camera parameter is a second focal gradient.

38. The method of claim 33, wherein step (b) comprises the step of generating said second image with a second camera having a second aperture size, said second aperture size being different from said first aperture size.

39. The method of claim 33, wherein step (b) comprises the step of generating said second image with a second camera having a second focal length, said second focal length being different from said first focal length.

40. The method of claim 33, wherein step (b) comprises the step of generating said second image with a second camera having a second distance between a second principal plane and an image detector plane of said second camera, said second distance being different from said first distance.

41. The method of claim 33, wherein step (c) comprises the step of performing a temporal relaxation procedure in accordance with said first and second images to generate said differential blur spread.

42. The method of claim 33, wherein step (c) comprises the steps of:

(1) generating a 2N point discrete Fourier transform of said first image;

(2) generating a 2N point discrete Fourier transform of said second image;

(3) generating a raw gain and said differential blur spread in accordance with said 2N point discrete Fourier transforms of said first and second images;

(4) generating a transform of a time-varying regularization vector in accordance with said raw gain and said differential blur spread;

(5) generating a transform of an impulse response in accordance with said time-varying regularization vector and said 2N point discrete Fourier transforms of said first and second images;

(6) updating said raw gain and said differential blur spread in accordance with said impulse response;

(7) generating a squared error in accordance with said impulse response, said updated raw gain, and said updated differential blur spread;

(8) testing said squared error for convergence; and (9) repeating steps (c)(4) through (c)(7) in accordance with said testing of step (c)(8).

43. The method of claim 33, wherein step (c) comprises the step of performing a spatial relaxation procedure in accordance with said first and second images to generate said differential blur spread.

44. The method of claim 43, wherein:

step (c) comprises the step of performing said spatial relaxation procedure in accordance with a forward pass through said first and second images to generate a plurality of forward differential blur spreads and a plurality of forward cost function values; and further comprising the steps of:

(d) determining a plurality of ranges corresponding to a plurality of objects in accordance with said plurality of forward differential blur spreads;

(e) performing said spatial relaxation procedure in accordance with a backward pass through said first and second images to generate a plurality of backward differential blur spreads and a plurality of backward cost function values;

(f) comparing said plurality of backward cost function values with said plurality of forward cost function values; and (g) updating said plurality of ranges in accordance with said comparison of step (f).

45. The method of claim 33, wherein step (c) comprises the steps of:

(1) selecting a first first-image sample from said first image and a corresponding first second-image sample from said second image;

(2) generating a first differential blur spread in accordance with said first first-image and first second-image samples;

(3) selecting a second first-image sample from said first image and a corresponding second second-image sample from said second image; and (4) generating a second differential blur spread in accordance with said second first-image and second second-image samples.

46. The method of claim 45, further comprising the steps of:

(d) determining a first range value corresponding to said first first-image and second-image samples in accordance with said first differential blur spread; and (e) determining a second range value corresponding to said second first-image and second-image samples in accordance with said second differential blur spread.

47. The method of claim 46, wherein said first range value corresponds to the height of a first stack of nested packages and said second range value corresponds to the height of a second stack of nested packages.

48. An apparatus for determining a differential blur spread corresponding to an object, comprising:

(a) a first camera for providing a first image of said object, said first camera having a first focal length, a first aperture size, a first distance between a second principal plane and an image detector plane of said first camera, and a first camera parameter;

(b) means, having a second camera parameter, for generating a second image of said object, said second camera parameter being different from said first camera parameter; and (c) means for generating said differential blur spread in accordance with said first and second images and independent of said first focal length, said first aperture size, and said first distance of said first camera.

49. The apparatus of claim 48, further comprising:

(d) means for determining a range of said object in accordance with said differential blur spread.

50. The apparatus of claim 49, further comprising:

(e) means for focussing a camera in accordance with said range.

51. The apparatus of claim 50, wherein said object is a package on a conveyor system and said camera is a high-resolution camera positioned overhead said conveyor system to generate images used to read a label on said package.

52. The apparatus of claim 48, wherein said first camera parameter is a first focal gradient and said second camera parameter is a second focal gradient.

53. The apparatus of claim 48, wherein means (b) comprises a second camera having a second aperture size, said second aperture size being different from said first aperture size.

54. The apparatus of claim 48, wherein means (b) comprises a second camera having a second focal length, said second focal length being different from said first focal length.

55. The apparatus of claim 48, wherein means (b) comprises a second camera having a second distance between a second principal plane and an image detector plane of said second camera, said second distance being different from said first distance.

56. The apparatus of claim 48, wherein means (c) comprises means for performing a temporal relaxation procedure in accordance with said first and second images to generate said differential blur spread.

57. The apparatus of claim 48, wherein means (c) comprises:

(1) means for generating a 2N point discrete Fourier transform of said first image and for generating a 2N point discrete Fourier transform of said second image;

(2) means for generating a raw gain and said differential blur spread in accordance with said 2N point discrete Fourier transforms of said first and second images;

(3) means for generating a transform of a time-varying regularization vector in accordance with said raw gain and said differential blur spread;

(4) means for generating a transform of an impulse response in accordance with said time-varying regularization vector and said 2N point discrete Fourier transforms of said first and second images;

(5) means for updating said raw gain and said differential blur spread in accordance with said impulse response;

(6) means for generating a squared error in accordance with said impulse response, said updated raw gain, and said updated differential blur spread; and (7) means for testing said squared error for convergence.

58. The apparatus of claim 48, wherein means (c) comprises means for performing a spatial relaxation procedure in accordance with said first and second images to generate said differential blur spread.

59. The apparatus of claim 58, wherein:

means (c) comprises means for performing said spatial relaxation procedure in accordance with a forward pass through said first and second images to generate a plurality of forward differential blur spreads and a plurality of forward cost function values; and further comprising:

(d) means for determining a plurality of ranges corresponding to a plurality of objects in accordance with said plurality of forward differential blur spreads;

(e) means for performing said spatial relaxation procedure in accordance with a backward pass through said first and second images to generate a plurality of backward differential blur spreads and a plurality of backward cost function values;

(f) means for comparing said plurality of backward cost function values with said plurality of forward cost function values; and (g) mean for updating said plurality of ranges in accordance with said comparison of means (f).

60. The apparatus of claim 48, wherein means (c) comprises:

(1) means for:
(a) selecting a first first-image sample from said first image and a corresponding first second-image sample from said second image, and
(b) selecting a second first-image sample from said first image and a corresponding second second-image sample from said second image; and (2) means for:
(a) generating a first differential blur spread in accordance with said first first-image and first second-image samples, and
(b) generating a second differential blur spread in accordance with said second first-image and second second-image samples.

61. The apparatus of claim 60, further comprising:
(d) means for:
(1) determining a first range value corresponding to said first first-image and second-image samples in accordance with said first differential blur spread; and
(2) determining a second range value corresponding to said second first-image and second-image samples in accordance with said second differential blur spread.

62. The apparatus of claim 61, wherein said first range value corresponds to the height of a first stack of nested packages and said second range value corresponds to the height of a second stack of nested packages.

63. The method of claim 1, wherein step (c) comprises the steps of:

(1) generating an initial differential blur spread in accordance with said first and second images; and (2) performing a recursive relaxation procedure in accordance with said first and second images and said initial differential blur spread to generate an improved differential blur spread.

64. The method of claim 1, wherein step (c) comprises the steps of:

(1) generating a 2N point discrete Fourier transform of said first image;

(2) generating a 2N point discrete Fourier transform of said second image;

(3) generating an initial gain and an initial differential blur spread in accordance with said 2N point discrete Fourier transforms of said first and second images;

(4) generating the discrete Fourier transform of a time-varying regularization vector in accordance with said initial gain and said initial differential blur spread;

(5) generating the discrete Fourier transform of the differential impulse response between said camera of step (a) and said camera of step (b) in accordance with said discrete Fourier transformed time-varying regularization vector;

(6) updating said initial gain and said initial differential blur spread in accordance with said discrete Fourier transformed differential impulse response;

(7) generating a squared error in accordance with said discrete Fourier transformed differential impulse response, said updated gain, and said updated differential blur spread;

(8) testing for the convergence of said squared error; and (9) repeating steps (c)(4) through (c)(7), in accordance with said testing of step (c)(8), using said updated gain and said updated differential blur spread.

65. The method of claim 64, wherein step (c)(4) employs a gaussian blur model.

66. The method of claim 64, wherein step (c)(4) employs a cylindrical sinc blur model.

67. The method of claim 1, where step (c) comprises the steps of:

(1) setting an initial differential blur spread equal to 1.0;

(2) performing a forward pass through said first and second images to generate a plurality of forward differential blur spreads and a plurality of forward cost function values using local recursive parameter adaption in the spatial domain;

(3) performing a backward pass through said first and second images, starting where the forward pass ended, to generate a plurality of backward differential blur spreads and a plurality of backward cost function values using local recursive parameter adaption in the spatial domain; and (4) selecting a plurality of local differential blur spreads corresponding to a plurality of image pixel locations, whereby each local differential blur spread is selected from a corresponding local forward differential blur spread and a corresponding local backward differential blur spread in accordance with the minimum of a corresponding local forward cost function value and a corresponding local backward cost function value.

68. The method of claim 67, wherein step (c) further comprises the step of:

(5) generating a plurality of range values from said plurality of local differential blur spreads, wherein each range value corresponds to an image pixel location.

69. The method of claim 3, wherein step (e) comprises the step of time-delayed focussing the focussed camera, said focussed camera being located overhead a conveyor system downstream of said camera used to generate said first image and said camera used to generate said second image.

70. The apparatus of claim 17, wherein means (c) comprises:
   (1) means for generating an initial differential blur spread in accordance with said first and second images; and
   (2) means for performing a recursive relaxation procedure in accordance with said first and second images and said initial differential blur spread to generate an improved differential blur spread.

71. The apparatus of claim 17, wherein means (c) comprises:
   (1) means for generating a 2N point discrete Fourier transform of said first image;
   (2) means for generating a 2N point discrete Fourier transform of said second image;
   (3) means for generating an initial gain and an initial differential blur spread in accordance with said 2N point discrete Fourier transforms of said first and second images;
   (4) means for generating the discrete Fourier transform of a time-varying regularization vector in accordance with said initial gain and said initial differential blur spread;
   (5) means for generating the discrete Fourier transform of the differential impulse response between said camera (a) and said camera means (b) in accordance with said discrete Fourier transformed time-varying regularization vector;
   (6) means for updating said initial gain and said initial differential blur spread in accordance with said discrete Fourier transformed differential impulse response;
   (7) means for generating a squared error in accordance with said discrete Fourier transformed differential impulse response, said updated gain, and said updated differential blur spread;
   (8) means for testing for the convergence of said squared error; and
   (9) means for repeating the operations of means (c)(4) through (c)(7), in accordance with said testing of means (c)(8), using said updated gain and said updated differential blur spread.

72. The apparatus of claim 71, wherein means (c)(4) employs a gaussian blur model.

73. The apparatus of claim 71, wherein means (c)(4) employs a cylindrical sinc blur model.

74. The apparatus of claim 17, where means (c) comprises:
   (1) means for setting an initial differential blur spread equal to 1.0;
   (2) means for performing a forward pass through said first and second images to generate a plurality of forward differential blur spreads and a plurality of forward cost function values using local recursive parameter adaption in the spatial domain;
   (3) means for performing a backward pass through said first and second images, starting where the forward pass ended, to generate a plurality of backward differential blur spreads and a plurality of backward cost function values using local recursive parameter adaption in the spatial domain; and
   (4) means for selecting a plurality of local differential blur spreads corresponding to a plurality of image pixel locations, whereby each local differential blur spread is selected from a corresponding local forward differential blur spread and a corresponding local backward differential blur spread in accordance with the minimum of a corresponding local forward cost function value and a corresponding local backward cost function value.

75. The apparatus of claim 74, wherein means (c) further comprises:
   (5) means for generating a plurality of range values from said plurality of local differential blur spreads, wherein each range value corresponds to an image pixel location.

76. The apparatus of claim 19, wherein means (e) comprises the means for time-delayed focussing the focussed camera, said focussed camera being located overhead a conveyor system downstream of said camera used to generate said first image and said camera used to generate said second image.

77. The method of claim 1, wherein step (a) further comprises the step of:
   (1) generating a calibration mapping corresponding to a plurality of test differential blur spreads and a plurality of test range values.

78. The method of claim 77, wherein step (a)(1) comprises the steps of:
   (A) providing a test object corresponding to a test range value;
   (B) generating a test image corresponding to said test object;
   (C) generating a test differential blur spread corresponding to said test image;
   (D) repeating steps (a)(1)(A) through (a)(1)(C) for a plurality of test range values to generate a plurality of test differential blur spreads; and
   (E) generating said calibration mapping by minimizing a cost function in accordance with said plurality of test range values and said plurality of test differential blur spreads.

79. The method of claim 3, wherein step (a) further comprises the step of:
   (1) generating a calibration mapping corresponding to a plurality of test differential blur spreads and a plurality of test range values.

80. The method of claim 79, wherein step (a)(1) comprises the steps of:
   (A) generating a first test image corresponding to a test object using said camera having said first camera parameter;
   (B) generating a second test image corresponding to said test object using said camera having said second camera parameter;
   (C) generating a test differential blur spread corresponding to said first and second test images;
   (D) generating a third test image with a test focussing camera, said third test image corresponding to said test differential blur spread;
   (E) determining a test focus distance corresponding to said test focussing camera during step (a)(1)(D);
   (F) repeating steps (a)(1)(A) through (a)(1)(E) for a plurality of test differential blur spreads; and
   (G) generating said calibration mapping by minimizing a cost function in accordance with said plurality of test differential blur spreads and said plurality of test focus distances.

81. The apparatus of claim 17, wherein means (c) comprises means for generating a calibration mapping corresponding to a plurality of test differential blur spreads and a plurality of test range values.

82. The apparatus of claim 81, wherein means (c) comprises:
(1) test camera means for generating a plurality of test images corresponding to a plurality of test objects corresponding to said plurality of test range values;
(2) means for generating said plurality of test differential blur spreads corresponding to said plurality of test images; and
(3) means for generating said calibration mapping by minimizing a cost function in accordance with said plurality of test range values and said plurality of test differential blur spreads.

83. The apparatus of claim 19, further comprising:
(f) means for generating a calibration mapping corresponding to a plurality of test differential blur spreads and a plurality of test focus distances.

84. The apparatus of claim 83, wherein means (f) comprises:
(1) test camera means, having said first camera parameter, for generating a plurality of first test images corresponding to a test object;
(2) test camera means, having said second camera parameter, for generating a plurality of second test images corresponding to said test object;
(3) means for generating said plurality of test differential blur spreads corresponding to said pluralities of first and second test images;
(4) a test focussing camera for generating a plurality of third test images, said plurality of third test images corresponding to said plurality of test differential blur spreads;
(5) means for determining said plurality of test focus distances corresponding to said test focussing camera; and
(6) means for generating said calibration mapping by minimizing a cost function in accordance with said plurality of test differential blur spreads and said plurality of test focus distances.

85. An apparatus for determining a differential blur spread corresponding to object, comprising:
(a) camera means, having a first camera parameter, for providing a first image of said object;
(b) camera means, having a second camera parameter, or providing a second image of said object, said second camera parameter being different from said first camera parameter;
(c) means for performing a relaxation procedure in accordance with said first and second images to generate said differential blur spread;
(d) means for determining a range of said object in accordance with said differential blur spread; and
(e) means for focussing a camera in accordance with said range.

86. The apparatus of claim 85, wherein said object is a package on a conveyor system and said camera is a high-resolution camera positioned overhead said conveyor system to generate images used to read a label on said package.

87. The apparatus of claim 85, wherein means (e) comprises the means for time-delayed focussing the focussed camera, said focussed camera being located overhead a conveyor system downstream of said camera used to generate said first image and said camera used to generate said second image.

88. The apparatus of claim 85, further comprising:
(f) means for generating a calibration mapping corresponding to a plurality of test differential blur spreads and a plurality of test focus distances.

89. The apparatus of claim 88, wherein means (f) comprises:
(1) test camera means, having said first camera parameter, for generating a plurality of first test images corresponding to a test object;
(2) test camera means, having said second camera parameter, for generating a plurality of second test images corresponding to said test object;
(3) means for generating said plurality of test differential blur spreads corresponding to said pluralities of first and second test images;
(4) a test focussing camera for generating a plurality of third test images, said plurality of third test images corresponding to said plurality of test differential blur spreads;
(5) means for determining said plurality of test focus distances corresponding to said test focussing camera; and
(6) means for generating said calibration mapping by minimizing a cost function in accordance with said plurality of test differential blur spreads and said plurality of test focus distances.

* * * * *

UNITED STATES PATENT AND TRADEMARK OFFICE
CERTIFICATE OF CORRECTION

PATENT NO. : 5,365,597
DATED : November 15, 1994
INVENTOR(S) : Lee F. Holeva

It is certified that error appears in the above-indentified patent and that said Letters Patent is hereby corrected as shown below:

Column 8, line 58, insert

--where:
$$c_2 = \frac{K}{c_1}$$
--

Column 10, line 68, delete "$+\bar{u}(n)\bar{u}(n)$" and insert therefor --$+\bar{u}(n)\bar{u}^t(n)$--.

Signed and Sealed this

Seventh Day of November, 1995

Attest:

BRUCE LEHMAN

Attesting Officer    Commissioner of Patents and Trademarks